(12) United States Patent
Jeon et al.

(10) Patent No.: US 8,054,885 B2
(45) Date of Patent: Nov. 8, 2011

(54) METHOD AND APPARATUS FOR DECODING/ENCODING A VIDEO SIGNAL

(75) Inventors: Byeong Moon Jeon, Seoul (KR); Seung Wook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 528 days.

(21) Appl. No.: 12/223,787

(22) PCT Filed: Nov. 9, 2007

(86) PCT No.: PCT/KR2007/005651
§ 371 (c)(1),
(2), (4) Date: Aug. 8, 2008

(87) PCT Pub. No.: WO2008/056959
PCT Pub. Date: May 15, 2008

(65) Prior Publication Data
US 2009/0310680 A1    Dec. 17, 2009

Related U.S. Application Data

(60) Provisional application No. 60/857,802, filed on Nov. 9, 2006.

(30) Foreign Application Priority Data

Dec. 22, 2006 (KR) .................... 10-2006-0132282

(51) Int. Cl.
*H04N 7/12* (2006.01)
*H04N 7/26* (2006.01)

(52) U.S. Cl. ............... 375/240.16; 375/240.12

(58) Field of Classification Search ............ 348/416, 348/699, 410, 413, 409, 453; 382/232, 236, 382/235, 239, 241, 242, 244, 238; 375/240.25, 375/240.01, 240.08, 240.12, 240.16, 240.15
See application file for complete search history.

(56) References Cited

U.S. PATENT DOCUMENTS

| | | | |
|---|---|---|---|
| 6,816,194 B2 | 11/2004 | Zhang et al. | |
| 7,535,383 B2 * | 5/2009 | Segall et al. | 341/50 |
| 7,643,560 B2 | 1/2010 | Hong et al. | |
| 7,742,524 B2 * | 6/2010 | Jeon et al. | 375/240.13 |
| 7,746,933 B2 * | 6/2010 | Park et al. | 375/240.25 |

(Continued)

FOREIGN PATENT DOCUMENTS

JP    07-079436    3/1995

(Continued)

OTHER PUBLICATIONS

Joint Video Team (JVT) of ISO/IEC MPEG&ITU-T VCEG, JVT-O202 AnnexS, Scalable Video Coding—Working Draft 2, 15 th Meeting: Busan, Apr. 16-22, 2005.

(Continued)

*Primary Examiner* — Behrooz Senfi
(74) *Attorney, Agent, or Firm* — Harness, Dickey & Pierce, P.L.C.

(57) ABSTRACT

A method of decoding a current layer using inter-layer prediction is disclosed. The present invention includes determining whether a position of a current block is included in a sampled reference layer, the current block included in the current layer, obtaining a plurality of prediction flags when the position of the current block is included in the sampled reference layer, and decoding the current layer using the plurality of the prediction flags.

12 Claims, 7 Drawing Sheets

U.S. PATENT DOCUMENTS

| | | | |
|---|---|---|---|
| 7,787,540 B2* | 8/2010 | Park et al. | 375/240.12 |
| 2005/0025368 A1 | 2/2005 | Glukhovsky | |
| 2005/0195900 A1* | 9/2005 | Han | 375/240.21 |
| 2005/0259729 A1 | 11/2005 | Sun | |
| 2006/0008003 A1 | 1/2006 | Ji et al. | |
| 2006/0013302 A1 | 1/2006 | Bao et al. | |
| 2006/0013313 A1 | 1/2006 | Han et al. | |
| 2006/0126962 A1 | 6/2006 | Sun | |
| 2006/0133484 A1 | 6/2006 | Park et al. | |
| 2006/0153295 A1 | 7/2006 | Wang et al. | |
| 2006/0159359 A1 | 7/2006 | Lee | |
| 2006/0165304 A1 | 7/2006 | Lee et al. | |
| 2006/0209959 A1 | 9/2006 | Sun | |
| 2006/0222067 A1 | 10/2006 | Park et al. | |
| 2006/0233249 A1 | 10/2006 | Park et al. | |
| 2006/0233254 A1 | 10/2006 | Lee et al. | |
| 2006/0245498 A1 | 11/2006 | Lee et al. | |
| 2007/0014348 A1 | 1/2007 | Bao et al. | |
| 2007/0014362 A1 | 1/2007 | Cruz et al. | |
| 2007/0047648 A1 | 3/2007 | Tourapis et al. | |
| 2007/0230575 A1* | 10/2007 | Han | 375/240.13 |
| 2008/0024513 A1 | 1/2008 | Raveendran | |
| 2008/0069247 A1 | 3/2008 | He | |
| 2008/0101470 A1 | 5/2008 | Hong et al. | |
| 2008/0137753 A1 | 6/2008 | He | |
| 2009/0060040 A1 | 3/2009 | Jeon et al. | |
| 2009/0257664 A1 | 10/2009 | Kao et al. | |

FOREIGN PATENT DOCUMENTS

| | | |
|---|---|---|
| JP | 09-102954 | 4/1997 |
| JP | 10-276437 | 10/1998 |
| JP | 2004-289745 | 10/2004 |
| JP | 2005-192219 | 7/2005 |
| KR | 10-2006-0006183 | 1/2006 |
| KR | 10-2006-0103226 A | 9/2006 |
| KR | 10-2006-0131718 | 12/2006 |
| RU | 2128405 | 3/1999 |
| RU | 2201654 | 3/2003 |
| WO | WO 2006/044370 A1 | 4/2006 |
| WO | WO 2006/078142 | 7/2006 |
| WO | WO 2006/101682 | 9/2006 |
| WO | WO 2006/108863 | 10/2006 |
| WO | WO 2007/115129 A1 | 10/2007 |
| WO | WO 2008/056959 | 5/2008 |

OTHER PUBLICATIONS

Russian Notice of Allowance dated Oct. 23, 2009 for corresponding Application No. 2008138072.

USPTO Office Action dated Dec. 4, 2009 for corresponding U.S. Appl. No. 12/223,819.

USPTO Office Action dated Dec. 4, 2009 for corresponding U.S. Appl. No. 12/223,823.

Office Action issued Dec. 17, 2008 by the Korean Intellectual Property Office for counterpart Korean Patent Application No. 10-2008-7017970.

European Search Report dated Dec. 10, 2009 for corresponding Application No. 07833958.7.

European Search Report dated Dec. 14, 2009 for corresponding Application No. 07834114.6.

European Search Report dated Dec. 14, 2009 for corresponding Application No. 07834118.7.

Francois, E. et al.: "Prop. 1 for CE10 Generic Ext. Spat. SVC" Joint Video Team (JVT) of ISO/IEC MPEG & ITU-T VCEG (ISO/IEC JTC1/SC29/WG11 and ITU-T SG16 Q6), No. JVT-o041r1, Apr. 14, 2005, pp. 1-36.

"Joint Scalable Video Model (JSVM) 7 (Jun. 10, 2006)" Joint Video Team (JVT) of ISO/IEC MPEG & ITU-T VCEG (ISO/IEC JTC1/SC29/WG11 and ITU-T SG16 Q.6), No. JVT-T202, Oct. 20, 2006, XP 030006634.

"JVSM Software Manual, JVSM 6.1", Joint Video Team (JVT) of ISO/IEC MPEG & ITU-T VCEG, Jul. 24, 2006, pp. 1-63.

Wang, Ye-Kui et al.: "System and Transport Interface of H.264/AVC Scalable Extension" IMAG E Processing, 2006 IEEE International Conference on, IEEE, PI, Oct. 1, 2006, pp. 165-168.

Wiegand, Thomas et al.: "Overview of the H.264/AVC video coding standard" IEEE Transactions on Circuits and Systems for Video Technology, IEEE Service Center, Piscataway, NJ, US, vol. 13, No. 7, Jul. 1, 2003, pp. 560-576.

Park, Seung-Wook, et al.: "Usage of store_base_rep_flag" Joint Video Team (JVT) of ISO/IEC MPEG & ITU-T VCEG (ISO/IEC JTC1/SC29/WG11 and ITU-T SG16 Q6)No. JVT-U090, Oct. 20, 2006, pp. 1-6.

Chinese Office Action dated Mar. 1, 2010 for corresponding Application No. 2007/80008103.0.

Chinese Office Action dated Feb. 12, 2010 for corresponding Application No. 2007/80008342.6. (with English translation).

JSVM Software Manual, JSVM 6.8.2.

Notice of Allowance for U.S. Appl. No. 12/223,823 dated Mar. 2, 2010.

Notice of Allowance for U.S. Appl. No. 12/223,819 dated Mar. 25, 2010.

Notice of Allowance issued Apr. 17, 2009 by the Korean Patent Office in counterpart Korean Patent Application No. 10-2008-7017970.

Notice of Allowance issued May 8, 2009 by the Korean Patent Office in counterpart Korean Patent Application No. 10-2008-7017973.

S. Sun et al., "Extended Spatial Scalability with Picture-Level Adaptation," Joint Video Team (JVT) of ISO/IEC MPEG & ITU-T VCEG (ISO/IEC JTC1/SC29/WG11 and ITU-T SG16 Q.6), 15$^{th}$ Meeting: Busan, KR, Apr. 16-22, 2005, pp. 1-21.

Office Action issued Apr. 28, 2009 by the Russian Patent Office in counterpart Russian Patent Application No. 2008138072 (with English language translation).

Australian Notice of Allowance dated Jun. 18, 2010 in AU Application No. 2007318376.

T. Weigand et al, "Joint Scalable Video Model JSVM-8" Joint Video Team (JVT) of ISO/IEC MPEG&ITU-T VCEG (ISO/IEC JTC1/SC29/WG11 and ITU-T SG16 Q.6) JVT U202, Oct. 20, 2006.

European Office Action dated Aug. 30, 2010 issued in corresponding European application No. 07834118.7.

AAVV: "Joint Draft 9 of SVC Amendment", Joint Video Team (JVT) of ISO/IEC MPEG & ITU-T VCEG, Document JVT-V201, pp. 1-482, Draft ISO/IEC 14496-10 (2006).

M. M. Hannuksela, et al.:"Support for SVC Header Rewriting to AVC", Joint Video Team (JVT) of ISO/IEC MPEG & ITU-T VCEG. Document JVT—W046, pp. 1-11, Apr. 2007.

International Search Report issued Mar. 12, 2008 in counterpart International Patent Application No. PCT/KR2007/005813.

International Search Report issued Mar. 12, 2008 in counterpart International Patent Application No. PCT/KR2007/005812.

International Search Report issued Mar. 6, 2008 in counterpart International Patent Application No. PCT/KR2007/005808.

International Search Report issued Jan. 8, 2008 in counterpart International Patent Application No. PCT/KR2007/004351.

European Office Action dated Jan. 27, 2011 issued in corresponding European Application No. 07833958.7.

Various Authors, "Joint Draft 10 of SVC Amendment", Document JVT-W201 of the Joint Video Team (JVT) of ISO/IEC MPEG & ITU-T VCEG, XP030007140, Jul. 3, 2007.

Various Authors, "Joint Draft 8 of SVC Amendment", Document JVT-U201 of the Joint Video Team (JVT) of ISO/IEC MPEG & ITU-T VCEG, XP030006798, Nov. 14, 2006.

Japanese Office Action dated May 18, 2011 issued in corresponding Japanese Application No. 2009-514215.

Wiegand, T., et al., Joint Scalable Video Model 8: Joint Draft 8 with proposed changes, Joint Video Team (JVT) of ISO/IEC MPEG & ITU-T VCEG (ISO/IEC JTC1/SC29/WG11 and ITU-T SG16 Q.6) JVT-U202_AnnexG, Oct. 26, 2006, pp. 377-382 (URL:http://wftp3.itu.int/av-arch/jvt-site/2006_10_Hangzhou/JVT-U202.zip).

Taiwan Office Action dated Jul. 26, 2011 issued in corresponding Taiwan Application No. 096143802.

* cited by examiner

FIG. 5

```
if( in_crop_window( CurrMbAddr ) &&
    adaptive_motion_prediction_flag ) {                                  ~510
    for( mbPartIdx = 0; mbPartIdx < NumMbPart( mb_type ); mbPartIdx++)
        if( MbPartPredMode( mb_type, mbPartIdx ) != Pred_L1 )
            motion_prediction_flag_l0[ mbPartIdx ]                        ~520
    for( mbPartIdx = 0; mbPartIdx < NumMbPart( mb_type ); mbPartIdx++)
        if( MbPartPredMode( mb_type, mbPartIdx ) != Pred_L0 )
            motion_prediction_flag_l1[ mbPartIdx ]                        ~530
}
```

FIG. 6

```
sub_mb_pred_in_scalable_extension( mb_type ) {
    ...
    if( in_crop_window( CurrMbAddr ) && adaptive_motion_prediction_flag ) {   ~610
        for( mbPartIdx = 0; mbPartIdx < 4; mbPartIdx++ )
            if( SubMbPredMode( sub_mb_type[ mbPartIdx ] ) != Direct &&
                SubMbPredMode( sub_mb_type[ mbPartIdx ] ) != Pred_L1 )
                motion_prediction_flag_l0[ mbPartIdx ]                        ~620
        for( mbPartIdx = 0; mbPartIdx < 4; mbPartIdx++ )
            if( SubMbPredMode( sub_mb_type[ mbPartIdx ] ) != Direct &&
                SubMbPredMode( sub_mb_type[ mbPartIdx ] ) != Pred_L0 )
                motion_prediction_flag_l1[ mbPartIdx ]                        ~630
}
```

FIG. 8

| | |
|---|---|
| if( !no_inter_layer_pred_flag ) { | ~ 810 |
|   slice_skip_flag | ~ 820 |
|   if( slice_skip_flag ) | |
|     num_mbs_in_slice_minus1 | |
|   else { | ~ 830 |
|     adaptive_prediction_flag | ~ 840 |
|     if( !adaptive_prediction_flag ) { | ~ 845 |
|       default_base_mode_flag | ~ 850 |
|       if( !default_base_mode_flag ) { | ~ 855 |
|         adaptive_motion_prediction_flag | ~ 860 |
|         if( !adaptive_motion_prediction_flag ) | ~ 865 |
|           default_motion_prediction_flag | ~ 870 |
|       } | |
|     } | |
|     adaptive_residual_prediction_flag | ~ 880 |
|   } | |
| } | |

METHOD AND APPARATUS FOR DECODING/ENCODING A VIDEO SIGNAL

This application is a National Phase entry of PCT Application No. PCT/KR2007/005651, filed on Nov. 9, 2007, which claims priority under 35 U.S.C. §119(e), 120 and 365 (c) to U.S. Provisional Application No. 60/857,802, filed on Nov. 9, 2006, and Korean Application No. 10-2006-0132282, filed on Dec. 22, 2006 in the U.S. Patent and Trademark Office, the contents of each of which are incorporated by reference in its entirety.

TECHNICAL FIELD

The present invention relates to a scheme for coding a video signal.

BACKGROUND ART

Generally, compression coding means a series of signal processing for transmitting digitalized information via a communication circuit or storing the digitalized information in a format suitable for a storage medium. There exist audio, video, characters and the like as targets for compression coding. Particularly, a scheme for performing compression coding on video is called video sequence compression. And, a video sequence is generally characterized in having spatial redundancy and temporal redundancy.

Specifically, a scalable-video-coded bit stream can be decoded partially and selectively. For instance, a decoder having low complexity is capable of decoding a base layer and a bit stream of a low data rate is extractable for transport via network having a limited capacity. In order to generate an image of high resolution more gradually, it is necessary to enhance a quality of image step by step.

DISCLOSURE OF THE INVENTION

Technical Problem

Specifically, a scalable-video-coded bit stream can be decoded partially and selectively. For instance, a decoder having low complexity is capable of decoding a base layer and a bit stream of a low data rate is extractable for transport via network having a limited capacity. In order to generate an image of high resolution gradually, it is necessary to enhance a quality of image step by step.

Technical Solution

Accordingly, the present invention is directed to a scheme for coding a video signal that substantially obviates one or more of the problems due to limitations and disadvantages of the related art.

An object of the present invention is to provide a method of enhancing a coding efficiency in coding a video signal.

Another object of the present invention is to provide a method of minimizing a transmission of information associated with inter-layer prediction in case that an area in a enhanced layer is not corresponding to a reference layer.

Another object of the present invention is to provide a method of minimizing a transmission of information associated with inter-layer prediction in a manner of confirming configuration information on a scalable-video-coded bit stream.

Another object of the present invention is to provide a method of minimizing a transmission of information associated with inter-layer prediction in a manner of confirming information indicating whether inter-layer prediction is executed.

A further object of the present invention is to provide a method of raising a coding efficiency in a manner of confirming configuration information of a scalable-video-coded bit stream in a proper position.

Advantageous Effects

Accordingly, the present invention provides the following effects or advantages.

First of all, it is checked whether a current block in a enhanced layer can be predicted by using inter-layer prediction. In case that the current block in the enhanced layer is not predicted by using the inter-layer prediction, it is unnecessary to transmit coding information used for the inter-layer prediction. Hence, the present invention raises a coding efficiency. Secondly, by identifying configuration information of a scalable-video-coded bit stream in a proper position, whereby transmission information associated with inter-layer prediction can be minimized. For instance, by identifying information indicating whether inter-layer prediction is executed and/or quality identification information, transmission information associated with inter-layer prediction can be minimized. Therefore, coding efficiency of a video signal can be considerably enhanced using the above-explained various methods.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 and FIG. 6 are diagrams for syntaxes relevant to macroblock and sub-macroblock predictions through inter-layer prediction according to one embodiment of the present invention, respectively;

FIG. 8 is a structural diagram of a syntax for obtaining adaptive prediction information in accordance with a presence or non-presence of inter-layer prediction execution according to one embodiment of the present invention.

BEST MODE

Figure 1:
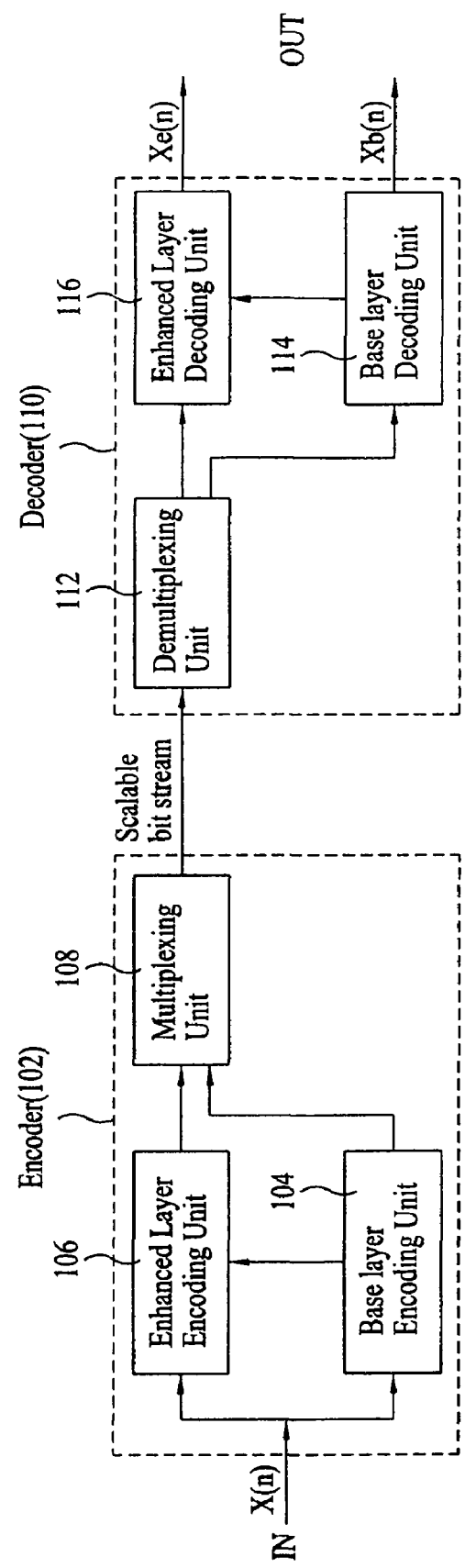
FIG. 1 is a schematic block diagram of a scalable video coding system according to the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of decoding a current layer using inter-layer prediction according to the present invention includes determining whether a position of a current block is included in a sampled reference layer, the current block included in the current layer, obtaining a plurality of prediction flags when the position of the current block is included in the sampled reference layer, and decoding the current layer using the plurality of the prediction flags.

Preferably, the current layer differs from the reference layer, which is from a same video signal of the current layer, in a screen ratio or a spatial resolution.

Preferably, the determining is based on offset information of the reference layer and a variable indicating a position of the current block in the enhanced layer.

Preferably, a plurality of the prediction flags include first information indicating whether a type of the current macroblock is derived from a corresponding block in the base layer, second information indicating whether to use a motion vector of the corresponding block in the base layer, and third information indicating whether to use a residual signal of the corresponding block in the base layer.

To further achieve these and other advantages and in accordance with the purpose of the present invention, a method of encoding a enhanced layer using inter-layer prediction according to the present invention includes, in determining whether a current block is included in a sampled base layer, generating a prediction flag required for the inter-layer prediction based on whether the current block is included in a sampled base layer and generating a bit stream of the enhanced layer, having a resolution different from that of the base layer, by using the base layer.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings.

First of all, compression coding of video signal data takes spatial redundancy, spatial redundancy, scalable redundancy, and inter-view redundancy into consideration. Compression coding scheme, which takes scalable redundancy into consideration, is just an embodiment of the present invention. And, the technical idea of the present invention is applicable to temporal redundancy, spatial redundancy, inter-view redundancy, and the like. In the present disclosure, coding can include both concepts of encoding and decoding. And, coding can be flexibly interpreted to correspond to the technical idea and scope of the present invention.

In a bit sequence configuration of a video signal, there exists a separate layer structure called a NAL (network abstraction layer) between a VCL (video coding layer) dealing with a moving picture encoding process itself and a lower system that transports and stores encoded information. An output generated from an encoding process is VCL data and is mapped by NAL unit prior to transport or storage. Each NAL unit includes compressed video data or RBSP (raw byte sequence payload: result data of moving picture compression) that is the data corresponding to header information.

The NAL unit basically includes two parts, a NAL header and an RBSP. The NAL header includes flag information (nal_ref_idc) indicating whether a slice becoming a reference picture of the NAL unit is included and information (nal_unit_type) indicating a type of the NAL unit. Compressed original data is stored in the RBSP. And, RBSP trailing bit is added to a last portion of the RBSP to represent a length of the RBSP as an 8-bit multiplication. As the type of the NAL unit, there is IDR (instantaneous decoding refresh) picture, SPS (sequence parameter set), PPS (picture parameter set), SEI (supplemental enhancement information), or the like.

So, if the information (nal_unit_type) indicating the type of the NAL unit indicates a scalable video coded slice, coding efficiency can be raised by adding various configuration informations relevant to the scalable coding. For instance, it is able to add flag information indicating whether a current access unit is an instantaneous decoding refresh (hereinafter abbreviated IDR) access unit, dependency identification information indicating spatial scalability, quality identification information, flag information (no_inter_layer_pred_flag) indicating whether inter-layer prediction is used, priority identification information, and the like. This will be explained in detail with reference to FIG. 2 later.

In the standardization, requirements for various profiles and levels are set to enable implementation of a target product with an appropriate cost. In this case, a decoder should meet the requirements decided according to the corresponding profile and level. Thus, two concepts, 'profile' and 'level' are defined to indicate a function or parameter for representing how far the decoder can cope with a range of a compressed sequence. And, a profile identifier (profile_idc) can identify that a bit stream is based on a prescribed profile. The profile identifier means a flag indicating a profile on which a bit stream is based. For instance, in H.264/AVC, if a profile identifier is 66, it means that a bit stream is based on a baseline profile. If a profile identifier is 77, it means that a bit stream is based on a main profile. If a profile identifier is 88, it means that a bit stream is based on an extended profile. Moreover, the profile identifier can be included in a sequence parameter set.

So, in order to handle a scalable sequence, it needs to be identified whether an inputted bit stream is a profile for a scalable sequence. If the inputted bit stream is identified as a profile for a scalable sequence, it is necessary to add a syntax to enable at least one additional information for a scalable sequence to be transmitted. In this case, the profile for the scalable sequence, which is an additional scheme of H.264/AVC, indicates a profile mode for handling scalable video. Since SVC is an additional scheme to conventional AVC, it may be more efficient to add a syntax as additional information for an SVC mode rather than add an unconditional syntax. For instance, when a profile identifier of AVC indicates a profile for a scalable sequence, if information on a scalable sequence is added, it is able to raise coding efficiency.

Various embodiments to provide an efficient video signal decoding method are explained as follows.

FIG. 1 is a schematic block diagram of a scalable video coding system according to the present invention.

In order to provide a sequence optimized for various communication environments and various terminals, a sequence provided to a terminal should be diversified. If a sequence optimized for each terminal is provided to the corresponding terminal, it means that a single sequence source is prepared for a combination value of various parameters including the number of transmission frames per a second, resolution, the number of bits per a pixel, and the like. So, the provision of the optimized sequence imposes a burden on a contents provider. Therefore, a contents provider encodes an original sequence into a compressed sequence data of high bit rate. In case of receiving a sequence request made by a terminal, the contents provider decodes the original sequence, encodes it into a sequence data suitable for a sequence processing capability of the terminal, and then provides the encoded data to the terminal. Since this transcoding is accompanied with the encoding-decoding-encoding process, it is unable to avoid a time delay generated in the course of providing a sequence. So, a complicated hardware device and algorithm are additionally required.

On the other hand, scalable video coding (SVC) is a coding scheme for encoding a video signal with a best image quality to enable a partial sequence of a generated picture sequence to be represented as a sequence by being decoded. In this case, the partial sequence may mean a sequence consisting of frames intermittently selected from a whole sequence. For a picture sequence encoded by SVC, a sequence size can be reduced for a low bit rate using spatial scalability. And an image quality of sequence can be lowered using quality scalability as well. In this case, a picture sequence having a small-size screen and/or a low frame number per second can be called a base layer and a sequence having a relatively large-size screen and/or a relatively high frame number per second can be called an enhanced or enhancement layer.

A picture sequence encoded by the above-mentioned scalable scheme enables a sequence representation of a low image quality in a manner of receiving and processing the partial sequence only. Yet, if a bit rate gets lowered, an image equality is considerably degraded. To solve a problem of the degraded image quality, it is able to provide a separate auxiliary picture sequence for a low bit rate, e.g., a picture sequence having a small-size screen and/or a low frame number per second. Such an auxiliary sequence can be called a base layer and a main picture sequence can be called an enhanced or enhancement layer.

In describing various embodiments for inter-layer prediction, the present disclosure uses the concept including a first layer and a second layer. For instance, the second layer can have a spatial resolution or screen ratio different from that of the first layer. And, the second layer can have an image quality different from that of the first layer. For detailed instance, the first layer can be a base layer and the second layer can be an enhanced layer. In performing inter-layer prediction, the first layer can be a reference layer and the second layer can be a current layer. The base and enhanced layers explained in the following description are just exemplary, which does not put restriction on the interpretation of the present invention.

The scalable video coding system is explained in detail as follows. First of all, the scalable coding system includes an encoder 102 and a decoder 110. The encoder 102 includes a base layer encoding unit 104, an enhanced layer encoding unit 106, and a multiplexing unit 108. And, the decoder can include a demultiplexing unit 112, a base layer decoding unit 114, and an enhanced layer decoding unit 116. The base layer encoding unit 104 is capable of generating a base bit stream by compressing an inputted sequence signal X(n). The enhanced layer encoding unit 106 is capable of generating an enhanced layer bit stream using the inputted sequence signal X(n) and information generated by the base layer encoding unit 104. And, the multiplexing unit 108 is capable of generating a scalable bit stream using the base layer bit stream and the enhanced layer bit stream.

The generated scalable bit stream is transported to the decoder 110 via a certain channel. The transported scalable bit stream can be discriminated into an enhanced layer bit stream and a base layer bit stream by the demultiplexing unit 112 of the decoder 110. The base layer decoding unit 114 receives the base layer bit stream and then decodes the base layer bit stream into a sequence signal of intra-macroblock and residual and motion information of inter-block. In this case, the corresponding decoding can be carried out based on single loop decoding method.

The enhanced layer decoding unit 116 receives the enhanced layer bit stream, and decodes an output sequence signal Xe(n) with reference to a base layer bit stream reconstructed by the base layer decoding unit 114. In this case, the output sequence signal Xb(n) will be a sequence signal having an image quality or resolution lower than that of the latter output sequence signal Xe(n).

Thus, each of the enhanced layer encoding unit 106 and the enhanced layer decoding unit 116 performs coding using inter-layer prediction. The inter-layer prediction may mean that a sequence signal of an enhanced layer is predicted by using motion information and/or texture information of a base layer. In this case, the texture information may mean a image data or a pixel value belonging to a macroblock. For instance, in the inter-layer prediction method, there are an intra base prediction mode or a residual prediction mode. The intra base prediction mode may mean a mode for predicting a block of the enhanced layer based on a corresponding area in the base layer. In this case, the corresponding area in the base layer may mean an area coded in an intra mode. Meanwhile, the residual prediction mode can use a corresponding area, having residual data that is an image difference value, in the base layer. In both case, the corresponding area in the base layer can be enlarged or reduced to use by sampling. The sampling may mean that image resolution is varied. And, the sampling can include resampling, downsampling, upsampling, and the like. For instance, it is able to resample intra samples to perform inter-layer prediction. And, image resolution can be reduced by regenerating pixel data using a downsampling filter. This can be called downsampling. Moreover, several additional pixel data can be made using an upsampling filter to increase image resolution. This can be called upsampling. The resampling can include both concepts of the downsampling and the upsampling. In the present disclosure, the terminology 'sampling' can be properly interpreted in accordance with a technical idea and scope of a corresponding embodiment of the present invention.

Meanwhile, a base layer and an enhanced layer are generated for different usages or purposes for the same sequence contents and may differ from each other in spatial resolution, frame rate, bit rate, and the like. In coding a video signal by inter-layer prediction, a non-dyadic case, a ratio of an enhanced layer to a base layer in spatial resolution is not an integer of 2, can be called extended spatial scalability (ESS). For instance, when an enhanced layer is coded by inter-layer prediction for a video signal having a ratio of 16:9 (horizontal:vertical), a case in which a base layer is coded into an image having a ratio of 4:3 may occur. In this case, since the base layer is coded in a cropping state that an original video signal is cropped in part, it is unable to cover a full area of an enhanced layer even if the base layer is enlarged for the inter-layer prediction. So, since the partial area of the enhanced layer fails to have a corresponding area in the upsampled base layer, the partial area may not use the upsampled base layer for inter-layer prediction. Namely, it means that the inter-layer prediction is not applicable to the partial area. In this case, coding informations used for the inter-layer prediction may not be transported. Detailed embodiments for this will be explained in detail with reference to FIGS. 5 to 8.

Figure 2:
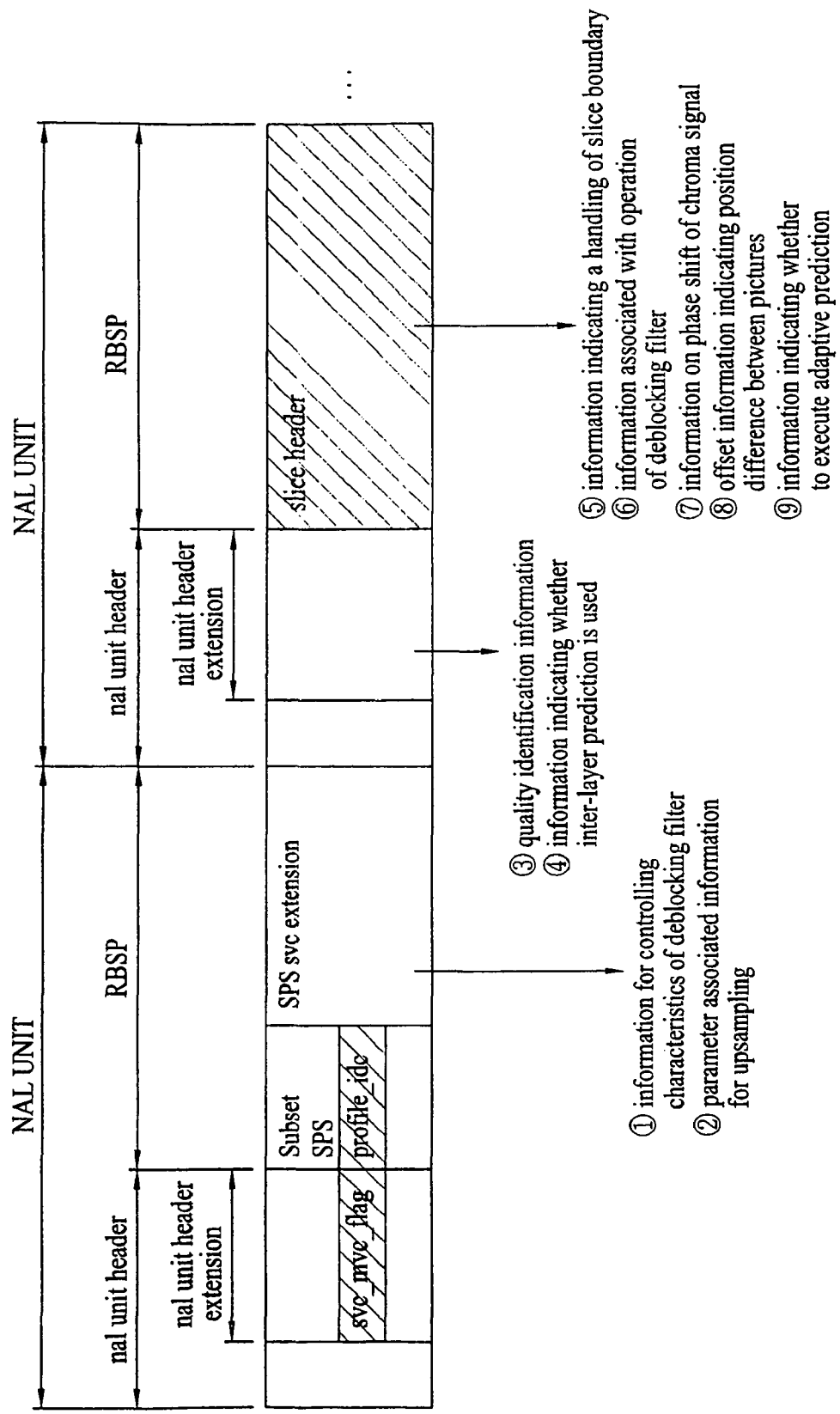
FIG. 2 and FIG. 3 are structural diagrams for configuration information on a scalable sequence addible to a scalable-video-coded bit stream and pictures for describing the configuration information according to one embodiment of the present invention, respectively.
Figure 3:
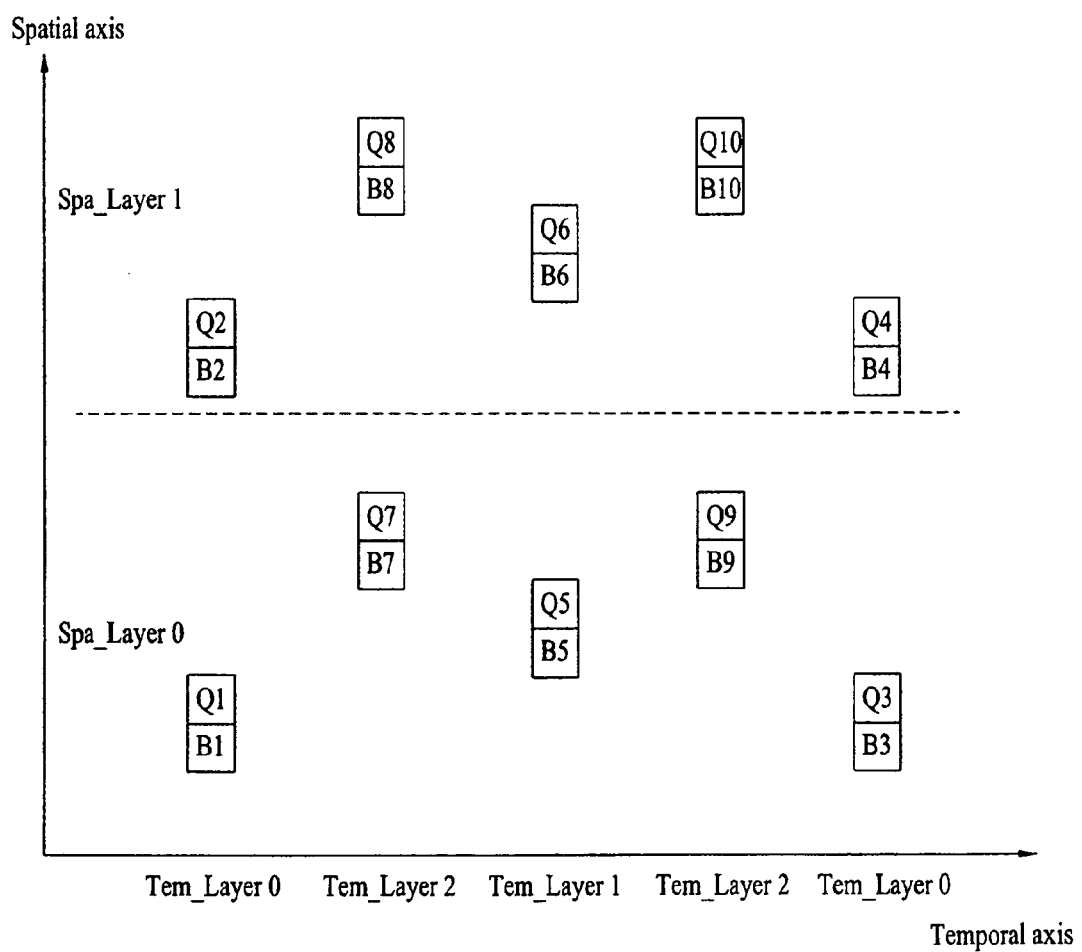

FIG. 2 and FIG. 3 are structural diagrams for configuration information on a scalable sequence addible to a scalable-video-coded bit stream and pictures for describing the configuration information according to one embodiment of the present invention, respectively;

FIG. 2 shows an example of a configuration of NAL unit enabling configuration informations on a scalable sequence to be added thereto. First of all, the NAL unit can mainly include a NAL unit header and an RBSP (raw byte sequence payload: result data of moving picture compression). The NAL unit header can include identification information (nal_ref_idc) indicating whether the NAL unit includes a slice of a reference picture and information (nal_unit_type) indicating a type of the NAL unit. And, an extension area of the NAL unit header can be limitedly included. For instance, if the information indicating the type of the NAL unit is associated with scalable video coding or indicates a prefix NAL unit, the NAL unit is able to include an extension area of the NAL unit header. In particular, if the nal_unit_type=20 or 14, the NAL unit is able to include the extension area of the NAL unit header. And, configuration informations for a scalable sequence can be added to the extension area of the NAL unit header according to flag information (svc_mvc_flag) capable of identifying whether it is SVC bit stream.

For another instance, if the information indicating the type of the NAL unit is information indicating a subset sequence parameter set, the RBSP can include information on the subset sequence parameter set. In particular, if nal_unit_type=15, the RBSP can include information on a subset sequence parameter set, information on a slice layer, and the like. In this case, the subset sequence parameter set can include an extension area of the sequence parameter set according to profile information. For example, if profile information (profile_idc) is a profile relevant to scalable video coding, the subset sequence parameter set can include an extension area of the sequence parameter set. Alternatively, a sequence parameter set can include an extension area of a sequence parameter set according to profile information. The extension area of the sequence parameter set can include information for controlling characteristics of a deblocking filter for inter-layer prediction, parameters associated with information for an upsampling process, and the like. Various configuration informations on a scalable sequence, e.g., configuration informations that can be included in an extension area of NAL unit header, an extension area of a sequence parameter set, and a slice layer, are explained in detail as follows.

First of all, it is possible to obtain flag information (inter_layer_deblocking_filter_control_present_f lag) indicating whether there exists the information for controlling the characteristics of the deblocking filter for inter-layer prediction from the extension area of the sequence parameter set. And, it is possible to obtain information (extended_spatial_scalability) indicating a position of the parameter associated information for the upsampling process from the extension area of the sequence parameter set. In particular, for example, if extended_spatial_scalability=0, it can mean that any parameter for the upsampling process does not exist in a sequence parameter set or a slice header. If extended_spatial_scalability=1, it can mean that a parameter for the upsampling process exists in a sequence parameter set. If extended_spatial_scalability=2, it can mean that a parameter for the upsampling process exists in a slice header.

Information ④ indicating whether inter-layer prediction is used may mean flag information indicating whether inter-layer prediction is used in decoding a coded slice. The flag information can be obtained from an extension area of a NAL header. For instance, if the flag information is set to 1, it may mean that the inter-layer prediction is not used. If the flag information is set to 0, the inter-layer prediction can be used or not in accordance with a coding scheme in a macroblock. This is because the inter-layer prediction in a macroblock unit may be used or not.

Quality identification information ③ means information identifying a quality for a NAL unit. In describing the configuration information, FIG. 3 is referred to. For instance, a single picture can be coded into layers differing from each other in quality. In FIG. 3, layers in Spa_Layer0 and Spa_Layer1 can be coded into layers differing from each other in quality. In particular, assuming that information identifying a quality for the NAL unit is named quality_id, layers B1, B2, . . . , B10 can be set to quality_id=0. And, layers Q1, Q2, . . . , Q10 can be set to quality_id=1. Namely, the layers B1, B2, . . . , B10 may mean the layers having the lowest image quality. These are called base pictures. The layers Q1, Q2, . . . , Q10 correspond to layers including the layers B1, B2, . . . , B10 and have image qualities better than those of the layers B1, B2, . . . , B10. And, the quality identification information can be defined in various ways. For instance, the quality identification information can be represented as 16 steps.

Identification information indicating spatial scalability means information identifying dependency on NAL unit. In describing the configuration information, FIG. 3 is referred to. For instance, the dependency may vary in accordance with spatial resolution. In FIG. 3, layers in Spa_Layer0 and Spa_Layer1 can have the same resolution. Layers in Spa_Layer0 can include pictures obtained by performing downsampling on layers in Spa_Layer1. In particular, for example, assuming that information identifying dependency on NAL unit is represented as dependency_id, layers in Spa_Layer0 may have the relation of dependency_id=0. And, layers in Spa_Layer1 may have the relation of dependency_id=1. The dependency identification information can be defined in various ways. Thus, NAL units having the same value as the information identifying the dependency can be represented as dependency representation.

Meanwhile, a single layer can be defined in accordance with the information identifying the dependency and the quality identification information. In this case, NAL units having the same values as the information identifying the dependency and the quality identification information can be represented as layer representation.

Identification information indicating temporal scalability means information identifying a temporal level for NAL unit. The temporal level can be described in a hierarchical B picture structure. For instance, a layer (B1, Q1) and a layer (B3, Q3) in Spa_Layer0 can have an identical temporal level Tem_Layer0. If a layer (B5, Q5) refers to a layer (B1, Q1) and a layer (B3, Q3), the layer (B5, Q5) can have a temporal level Tem_Layer1 higher than a temporal level Tem_Layer0 of the layer (B1, Q1) and the layer (B3, Q3). Likewise, if a layer (B7, Q7) refers to a layer (B1, Q1) and a layer (B5, Q5), the layer (B7, Q7) can have a temporal level Tem_Layer2 higher than a temporal level Tem_Layer1 of the layer (B5, Q5). All the NAL units within a single access unit can have an identical temporal level value. In case of an IDR access unit, the temporal level value may become 0.

Flag information indicating whether a reference base picture is used as a reference picture indicates whether reference base pictures are used as reference pictures in an inter-layer prediction process or decoded pictures are used as reference pictures in the inter-layer prediction process. The flag information can have the same value for NAL units in a same layer, i.e., for NAL units having the same information identifying dependency.

Priority identification information means information identifying a priority of NAL unit. It is possible to provide inter-layer extensibility or inter-picture extensibility using the priority identification information. For instance, it is possible to provide a user with sequences at various temporal and spatial levels using the priority identification information. So, the user is able to view a sequence in specific time and space or a sequence in accordance with a different restriction condition only. The priority information can be configured in various ways in accordance with its reference condition. The priority information can be randomly configured without being based on a special reference. And, the priority information can be determined by a decoder.

And, configuration information in an extension area of NAL unit header can include flag information indicating whether a current access unit is an IDR access unit.

Various information for inter-layer prediction can be included in a slice layer. For instance, information ⑤ indicating a handling of a slice boundary in an upsampling process, information ⑥ associated with an operation of a deblocking filter, information ⑦ related to a phase shift of a chroma signal, offset information ⑧ indicating a position difference between layers, and information ⑨ indicating a presence or non-presence of an execution of adaptive prediction, and the like can be included. The above information can be obtained from a slice header.

As examples of the information ⑥ associated with the operation of the deblocking filter, there may be information (disable_deblocking_filter_idc) indicating an operational method of the deblocking filter, offset information (inter_layer_slice_alpha_c0_offset_div2, inter_layer_slice_beta_offset_div2) necessary for a deblocking filtering execution, and the like.

As examples of the information ⑦ on the phase shift of the chroma signal, there may be informations (scaled_ref_layer_left_offset, scaled_ref_layer_top_offset, scaled_ref_layer_right_offset, scaled_ref_layer_bottom_offset) on horizontal and vertical phase shifts of a chroma component of a picture used for inter-layer prediction.

As examples of the offset information ⑧ indicating the position difference between layers, there may be offset informations (scaled_ref_layer_left_offset, scaled_ref_layer_top_offset, scaled_ref_layer_right_offset, scaled_ref_layer_bottom_offset) indicating top, bottom, left and right position differences between an upsampled picture used for inter-layer prediction and a current picture.

As an example of the information ⑤ indicating the handling of a macroblock located on slice boundary in the base layer upsampling process, there may be information (constrained_intra_resampling_flag) indicating whether a current macroblock can not be predicted by using corresponding intra-coded block in the first layer in case that a corresponding intra-coded block in the first layer exists over at least two slices in the second layer.

And, the information ⑨ indicating a presence or non-presence of the execution of the adaptive prediction is capable of indicating a presence or non-presence of prediction associated information within a slice header and a macroblock layer. In accordance with the information indicating the presence or non-presence of the execution of the adaptive prediction, it is able to decide what kind of an adaptive prediction method will be used. This will be explained in detail with reference to FIG. 8 later.

Figure 4:
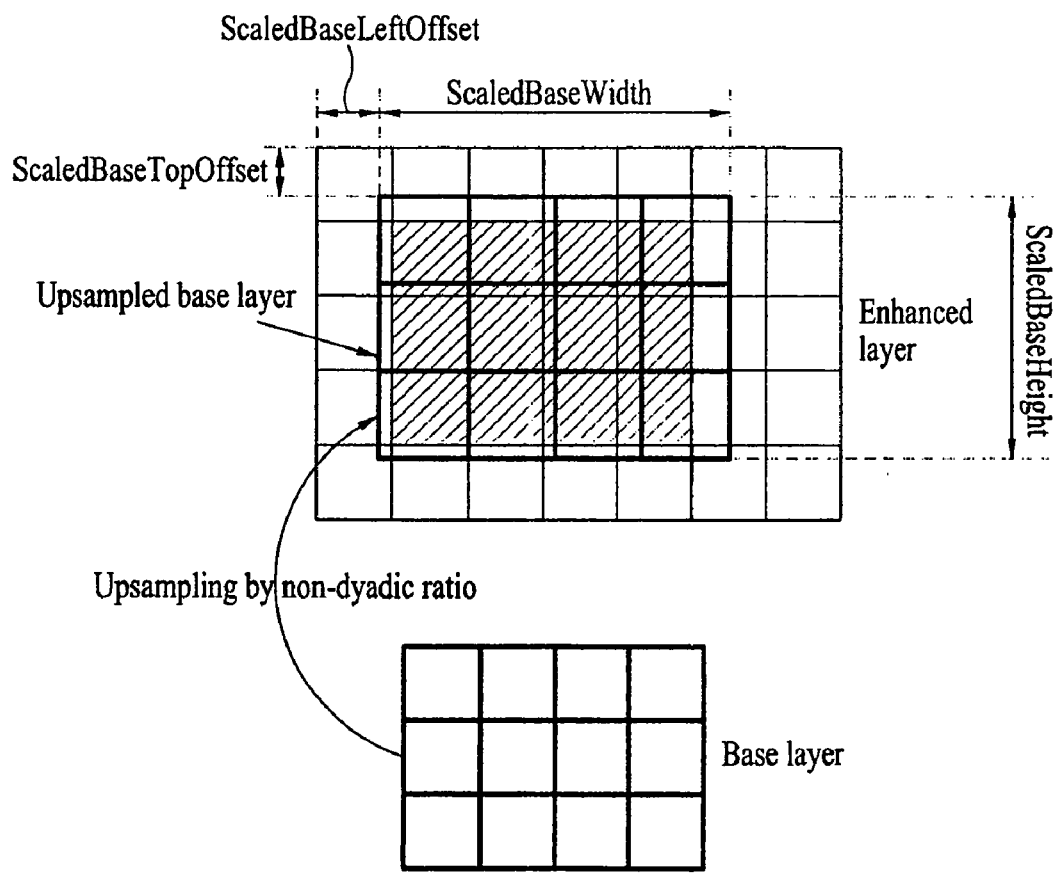
FIG. 4 is a diagram for a cropping relation between a sampled base layer and an enhanced layer.

FIG. 4 is a diagram for a cropping relation between a sampled base layer and an enhanced layer.

In scalable video coding, it is possible to check whether a current block of an enhanced layer can use inter-layer prediction. For instance, it is possible to check whether an area corresponding to all pixels within a current block exists in a base layer. As a result of the checking process, if the current block of the enhanced layer is not used for inter-layer prediction, it is unnecessary to transport coding information used for inter-layer prediction. Hence, it is able to raise a coding efficiency.

Thus, it is able to define a function capable of checking whether a current block of an enhanced layer can use inter-layer prediction. For instance, a function 'in_crop_window( )' can be defined as a function for checking whether an area corresponding to all pixels within a current block exists in a base layer. Assuming that a macroblock index in a horizontal direction on an enhance layer is set to 'mbIdxX' and a macroblock index in a vertical direction is set to 'mbIdxY', if the following conditions are met, the function in_crop_window( ) can return a value 'TRUE (or '1')'.

$mbIdxX \geq (ScaledBaseLeftOffset+15)/16$ $mbIdxX \leq (ScaledBaseLeftOffset+ScaledBaseWidth-1)/16$ $mbIdxY \geq (ScaledBaseTopOffset+15)/16$ $mbIdxY \leq (ScaledBaseTopOffset+ScaledBaseHeight-1)/16$ The 'mbIdxX' can be derived using a macroblock address and the number of macroblocks in the horizontal direction. The 'mbIdxY' can be derived by a method differing according to whether application of macroblock adaptive frame-field is applied or not. For instance, if the macroblock adaptive frame-field is applied, it can be derived by considering a macroblock pair. In considering the macroblock pair, it is assumed that an index of a top macroblock is set to 'mbIdxY0' and that an index of a bottom macroblock is set to 'mbIdxY1'. The 'mbIdxY0' can be derived from offset information indicating a top position difference between an upsampled picture used for inter-layer prediction and a current picture and macroblock number information in a horizontal direction. In this case, a value of the horizontal macroblock number information may differ in accordance with whether a current picture is a frame picture or a field picture. The 'mbIdxY1' can be derived from offset information indicating a top position difference between an upsampled picture used for inter-layer prediction and a current picture and macroblock number information in a vertical direction. Meanwhile, if the macroblock adaptive frame-field is not applied, the 'mbIdxY0' and the 'mbIdxY1' can be set to the same value.

The 'ScaledBaseLeftOffset' indicates offset information indicating a left position difference between an upsampled picture used for inter-layer prediction and a current picture. The 'ScaledBaseTopOffset' indicates offset information indicating a top position difference between an upsampled picture used for inter-layer prediction and a current picture. The 'ScaledBaseWidth' indicates a horizontal width of an upsampled picture. And, the 'ScaledBaseHeight' indicates a vertical height of an upsampled picture.

If any one of the above conditions is not satisfied, the function in_crop_window( ) can return a value of 'FALSE (or '0')'.

In case that a pixel corresponding to at least one pixel within a current block (CurrMbAddr) is not in an upsampled base layer, i.e., in case that the function in_crop_window (CurrMbAddr) returns the value of 'FALSE', information associated with inter-layer prediction is not used for the current block and this information may not be transported. Hence, according to the embodiment of the present invention, if it is identified that the corresponding base layer area does not exist via the in_crop_window(CurrMbAddr), it is able to omit the transport of the information associated with the inter-layer prediction for the current block.

According to one embodiment of the present invention, a case of performing coding by using the function in_crop_window( ) is explained as follows.

First of all, in case that it is identified that an area corresponding to a current block exists in a base layer via 'in_crop_window(CurrMbAddr)', the enhanced layer encoding unit 106 performs inter-layer prediction using texture and/or motion information of the base layer. In this case, the motion information can include reference index information, motion vector information, partition information, etc.

In case that texture and/or motion information of the current block is set to the texture and/or motion information of the corresponding block or in case that texture and/or motion information of the current block is derived from the texture and/or motion information of the corresponding block, the enhanced layer encoding unit 106 adds instruction information instructing the intact or derived information to a data stream of an enhanced layer, and then informs the decoder 110 of the addition. But, in case that it is identified that an area corresponding to a current block does not exist in a base layer via 'in_crop_window(CurrMbAddr)', the enhanced layer encoding unit 106 is able to generate an enhanced layer without performing inter-layer prediction. Meanwhile, if the decoder 110 confirms that an area corresponding to a current block does not exist in a base layer via 'in_crop_window (CurrMbAddr)', the decoder 110 decides that the instruction information has not been transmitted.

FIG. 5 and FIG. 6 are diagrams for syntaxes relevant to macroblock and sub-macroblock predictions through inter-layer prediction according to one embodiment of the present invention, respectively.

In case of performing inter-layer prediction, information associated with inter-layer prediction in slice data of a current NAL is transported to a decoder. For instance, in case of motion vector prediction of a current block of an enhanced layer, a flag (motion_prediction_flag_lx) indicating whether to use a motion vector of a base layer can be obtained from a macroblock layer. According to an embodiment of the present invention, the decoder is able to know whether the information associated with inter-layer prediction is transported by an encoder in a manner of checking 'in_crop_window(CurrMbAddr)' [510, 610]. For instance, if an area corresponding to a current block does not exist in a base layer in accordance with the 'in_crop_window(CurrMbAddr)', the flag 'motion_prediction_flag__10/11' may not be transported on a bit stream [520/530, 620/630].

And, a flag 'adaptive_motion_prediction_flag' indicating whether information associated with motion vector prediction is present within a macroblock layer can be obtained from slice data of a current NAL. According to an embodiment of the present invention, information associated with inter-layer prediction may not be transported by the encoder in a manner of checking both of the 'adaptive_motion_prediction_flag' and the 'in_crop_window(CurrMbAddr)' [510]. For instance, if an area corresponding to a current block does not exist in a base layer in accordance with the 'in_crop_window(CurrMbAddr)' or if information associated with motion vector prediction does not exist within a macroblock in accordance with the 'adaptive_motion_prediction_flag', the flag 'motion_prediction_flag__10/11' may not be transported [520/530, 620/630]. The above-described technical idea is identically applicable to sub-macroblock prediction shown in FIG. 6.

Thus, only if both of the two kinds of conditions are satisfied after identification of the two kinds of informations, the information associated with inter-layer prediction is transported. Hence, a coding efficiency can be raised.

Figure 7:
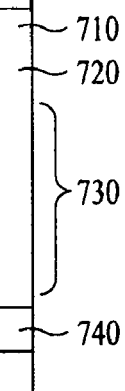
FIG. 7 is a diagram of a syntax relevant to residual prediction through inter-layer prediction according to one embodiment of the present invention.

FIG. 7 is a diagram of a syntax relevant to residual prediction through inter-layer prediction according to one embodiment of the present invention.

In case of performing inter-layer prediction, information associated with inter-layer prediction in slice data of a current NAL is transported to a decoder. For instance, in case of predicting a residual signal of a current block, a flag 'residual_prediction_flag' indicating whether to use a residual signal of a base layer can be obtained from a macroblock layer [740]. In this case, the base layer can be known using layer representation information. According to an embodiment of the present invention, information associated with inter-layer prediction may not be transported by an encoder in a manner of confirming the 'in_crop_window(CurrMbAddr)'.

For instance, the 'residual_prediction_flag' can be obtained in accordance with information 'adaptive_residual_prediction_flag' indicating a presence of information associated with prediction of a residual signal within a macroblock and information of a slice type of current block [710]. The 'residual_prediction_flag' also can be obtained according to 'base_mode_flag'. The 'base_mode_flag' indicates that whether a type (mb_type) of a current macroblock is derived from a corresponding area of a base layer [720]. The 'residual_prediction_flag' also can be obtained according to a type of the current macroblock and the function in_crop_window(CurrMbAddr). For example, The 'residual_prediction_flag' can be obtained when a type of macroblock and sub-macroblock is not intra mode [MbPartPredType(mb_type, 0)!=Intra__16×16(8×8 and 4×4)] and the value of in_crop_window(CurrMbAddr) is 'true', which means that an area corresponding to a current macroblock exists in a base layer [730]. If the type of the current macroblock is not the intra mode or the area corresponding to a current macroblock do not exist in the base layer [in_crop_window(CurrMbAddr)=0], the residual prediction is not performed. And, the encoder 102 generates an enhanced layer while the 'residual_prediction_flag' is not included.

If the 'residual_prediction_flag' is set to '1', a residual signal of a current block is predicted from a residual signal of the base layer. If the 'residual_prediction_flag' is set to '0', a residual signal is encoded without a inter-layer prediction. If the "residual_prediction_flag" does not exist in macroblock layer, it can be derived as follows. For instance, only if the following conditions are entirely satisfied, the 'residual_prediction_flag' can be derived into a preset value (default_residual_prediction_flag). First of all, 'base_mode_flag' should be set to '1' or a type of a current macroblock should not be an intra mode. Secondly, 'in_crop_window(CurrMbAddr)' should be set to '1'. Thirdly, a flag 'no_inter_layer_pred_flag' indicating whether inter-layer prediction is used should be set to '0'. Fourthly, a slice type should not be an EI slice. Otherwise, it can be derived into '0'.

When an area corresponding to a current sequence block does not exist in a base layer via 'in_crop_window(CurrMbAddr)', the enhanced layer decoding unit 116 decides that motion prediction flag (motion_prediction_flag) information does not exist in a macroblock or a sub-macroblock and reconstructs a video signal using a data bit stream of an enhanced layer only without inter-layer prediction. If a syntax element for the residual prediction is not included in a data bit stream of an enhanced layer, the enhanced layer decoding unit 116 is able to derive a residual prediction flag 'residual_prediction_flag'. In doing so, it is able to consider whether an area corresponding to a current block exists in a base layer via 'in_crop_window(CurrMbAddr)'. If the 'in_crop_window (CurrMbAddr)' is set to '0', the enhanced layer decoding unit 116 can confirm that the area corresponding to the current sequence block does not exist in the base layer. In this case, the 'residual_prediction_flag' is derived into '0' and then is able to reconstruct a video signal using data of an enhanced layer only without residual prediction using a residual signal of the base layer.

FIG. 8 is a diagram of a syntax for obtaining adaptive prediction information in accordance with a presence or non-presence of inter-layer prediction execution according to one embodiment of the present invention.

According to an embodiment of the present invention, in a manner of confirming configuration information of the scalable-video-coded bit stream, information associated with inter-layer prediction may not be transported by an encoder. The configuration information of the scalable-video-coded bit stream can be obtained from an extension area of a NAL header. For instance, adaptive prediction information can be obtained based on information 'no_inter_layer_pred_flag' indicating whether inter-layer prediction is used [810]. The adaptive prediction information can indicate whether a syntax associated with prediction exists in a corresponding position. For instance, there may exist information 'adaptive_prediction_flag' indicating whether a syntax associated with prediction exists in a slice header and a macroblock layer, information 'adaptive_motion_prediction_flag' indicating whether a syntax associated with motion prediction exists in a macroblock layer, information 'adaptive_residual_prediction_flag' indicating whether a syntax associated with residual prediction exists in a macroblock layer, and the like.

In case that inter-layer prediction is carried out in accordance with the information indicating whether the inter-layer prediction is used, a flag information 'slice_skip_flag' indicating a presence or non-presence of slice data can be firstly obtained [820]. By confirming the information indicating the presence of the slice data, it is able to decide whether to derive informations within a macroblock to perform inter-layer prediction. In accordance with the information indicating the presence of the slice data, if the slice data exists within the slice [830], it is able to obtain an adaptive prediction flag 'adaptive_prediction_flag' [840]. And, it is also able to obtain information 'adaptive_residual_prediction flag' indicating whether a syntax associated with residual prediction exists in a macroblock layer [880]. In accordance with the adaptive prediction flag, it is able to obtain information 'default_base_mode_flag' indicating how to derive information that indicates whether to predict motion information and the like from a correspondent block of the base layer [850]. In case that the motion information and the like are not predicted from a correspondent block of the base layer [855], it is able to obtain information 'adaptive_motion_prediction_flag' indicating whether a syntax associated with motion prediction exists in the macroblock layer [860]. If the syntax associated with motion prediction does not exist in the macroblock layer [865], it is able to obtain information 'default_motion_prediction_flag' indicating how to infer motion prediction flag information [870].

The information 'adaptive_motion_prediction_flag' indicating whether the syntax associated with motion prediction exists in the macroblock layer and the information 'adaptive_residual_prediction_flag' indicating whether the syntax associated with residual prediction exists in the macroblock layer are usable within the macroblock layer. For instance, it is able to obtain a flag 'motion_prediction_flag_lx' indicating whether to use a motion vector of the base layer based on the 'adaptive_motion_prediction_flag'. And, it is able to obtain a flag 'residual_prediction_flag' indicating whether to use a residual signal of the base layer based on the 'adaptive_residual_prediction_flag'.

As mentioned in the foregoing description, the decoder/encoder, to which the present invention is applicable, is provided to a broadcast transmitter/receiver for multimedia broadcasting such as DMB (digital multimedia broadcasting) to be used in decoding video signal, data signals, etc. And, the multimedia broadcast transmitter/receiver can include a mobile communication terminal.

A decoding/encoding method, to which the present invention is applied, is configured with a program for computer execution and then stored in a computer-readable recording medium. And, multimedia data having a data structure of the present invention can be stored in computer-readable recording medium. The computer-readable recording media include all kinds of storage devices for storing data that can be read by a computer system. The computer-readable recording media include ROM, RAM, CD-ROM, magnetic tapes, floppy discs, optical data storage devices, etc. and also includes a device implemented with carrier waves (e.g., transmission via internet). And, a bit stream generated by the encoding method is stored in a computer-readable recording medium or transmitted via wire/wireless communication network.

INDUSTRIAL APPLICABILITY

Accordingly, while the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for decoding a video signal, with a decoder, comprising:
    obtaining, with a demultiplexing unit, prediction identification information related to prediction between layers when an area corresponding to all pixels within a current block of an enhanced layer exists in an upsampled reference picture, the upsampled reference picture being upsampled from a reference picture of a base layer; and
    decoding, with an enhanced layer decoding unit, the current block based on the prediction identification information,
    wherein the prediction identification information includes at least one of information indicating whether a block type of the current block is derived from the base layer, information indicating whether a motion information of the current block is derived from the base layer, information indicating whether a residual signal of the current block is derived from the base layer, and the decoder includes the demultiplexing unit, the enhanced layer decoding unit.

2. The method of claim 1, wherein a spatial resolution of the enhanced layer is higher than that of the base layer.

3. The method of claim 1, further comprising:
    obtaining, with the demultiplexing unit, offset information indicating a position difference between at least one boundary pixel of the upsampled reference picture and at least one boundary pixel of a current picture, the current picture including the current block; and determining, with the demultiplexing unit, whether the current block is positioned in the upsampled reference picture based on the offset information.

4. The method of claim 1, wherein the prediction identification information is obtained from a macroblock layer.

5. The method of claim 4, wherein the prediction identification information is obtained as a predetermined value from a slice layer when the prediction identification information does not exist in the macroblock layer.

6. A method for decoding a video signal, with a encoder, comprising:
  obtaining, with an enhanced layer encoding unit, offset information indicating a position difference between at least one boundary pixel of a current picture of an enhanced layer and at least one boundary pixel of an upsampled reference picture, the upsampled reference picture being upsampled from a reference picture of a base layer;
  determining, with the enhanced layer encoding unit, whether a current block of the current picture is positioned in the reference picture based on the offset information;
  generating, with the enhanced layer encoding unit, prediction identification information related to prediction between layers when an area corresponding to all pixels within the current block exists in the reference picture,
  wherein the encoder includes the enhanced layer encoding unit.

7. The method of claim 6, wherein the prediction identification information includes at least one of information indicating whether a block type of the current block is derived from the base layer, information indicating whether a motion information of the current block is derived from the base layer, and information indicating whether a residual signal of the current block is derived from the base layer.

8. The method of claim 1, wherein the video signal is received as a broadcast signal.

9. A non-transitory computer-readable medium in which a program to execute the method of claim 1 is recorded.

10. An apparatus of decoding a video signal, comprising:
  a first enhanced layer decoding unit obtaining prediction identification information related to prediction between layers when a current block of an enhanced layer is positioned in an upsampled reference picture, the upsampled reference picture being upsampled from a reference picture of a base layer; and
  a second enhanced layer decoding unit decoding the current block based on the prediction identification information,
  wherein the prediction identification information includes at least one of information indicating whether a block type of the current block is derived from the base layer, information indicating whether a motion information of the current block is derived from the base layer, and information indicating whether a residual signal of the current block is derived from the base layer.

11. The apparatus of claim 10, wherein a spatial resolution of the enhanced layer is higher than that of the base layer.

12. The apparatus of claim 10, further comprising:
  a third enhanced layer decoding unit obtaining offset information indicating a position difference between at least one boundary pixel of the upsampled reference picture and at least one boundary pixel of a current picture including the current block, and determining whether the current block is positioned in the upsampled reference picture based on the offset information.

* * * * *